United States Patent
Askenazi et al.

(10) Patent No.: US 12,446,679 B2
(45) Date of Patent: Oct. 21, 2025

(54) METHOD FOR DETERMINING PARAMETERS SPECIFIC TO THE CUSTOM-MADE COLORING OF THE HAIRS OF A GIVEN INDIVIDUAL

(71) Applicant: L'OREAL, Paris (FR)

(72) Inventors: Benjamin Askenazi, Saint Ouen (FR); Johan Aubert, Clichy (FR); Jean-Dominique Bazin De Bezons, Saint Ouen (FR); Olivier Leseur, Clichy (FR); Romain Roncin, Clichy (FR)

(73) Assignee: L'OREAL, Paris (FR)

( * ) Notice: Subject to any disclaimer, the term of this patent is extended or adjusted under 35 U.S.C. 154(b) by 1039 days.

(21) Appl. No.: 17/442,365

(22) PCT Filed: Mar. 25, 2020

(86) PCT No.: PCT/EP2020/058417
§ 371 (c)(1),
(2) Date: Sep. 23, 2021

(87) PCT Pub. No.: WO2020/193654
PCT Pub. Date: Oct. 1, 2020

(65) Prior Publication Data
US 2022/0175112 A1    Jun. 9, 2022

(30) Foreign Application Priority Data
Mar. 26, 2019 (FR) ...................................... 19 03157

(51) Int. Cl.
*A45D 44/00* (2006.01)
*B01F 33/84* (2022.01)
(Continued)

(52) U.S. Cl.
CPC ........ *A45D 44/005* (2013.01); *B01F 33/8442* (2022.01); *B44D 3/003* (2013.01); *G06Q 30/0621* (2013.01); *G06Q 50/10* (2013.01)

(58) Field of Classification Search
CPC .. A45D 44/005; B44D 3/003; G06Q 30/0621; G06Q 50/10; G06Q 30/0641; A61B 5/448; A61B 5/1032
(Continued)

(56) References Cited

U.S. PATENT DOCUMENTS

| 2004/0000015 A1 | 1/2004 | Grossinger et al. |
| 2005/0165705 A1 | 7/2005 | Lauper et al. |

(Continued)

FOREIGN PATENT DOCUMENTS

| CN | 105378781 A | 3/2016 |
| EP | 0 443 741 A1 | 8/1991 |

(Continued)

OTHER PUBLICATIONS https://www.lorealprofessionnel.co.uk/dia-color (Year: 2023).*

Primary Examiner — Lisa M Caputo
Assistant Examiner — Sharah Zaab
(74) Attorney, Agent, or Firm — POLSINELLI PC (57) ABSTRACT

The present invention relates to a method for determining a parameter specific to the custom-made coloring of hairs of a given individual, the method including the following steps:
  receiving magnitudes representative of a first target color and of a first initial color in a colorimetric space,
  determining a cosmetic product composition according to magnitudes received and a colorimetric rendering model,
  applying a cosmetic product having the determined composition on the hairs to be colored of the individual in order to obtain colored hairs, (Continued)

evaluating the color of the colored hairs in order to a magnitude representative of a first final color in the colorimetric space, and determining a colorimetric deviation parameter specific to the individual according to magnitudes representative of the first final color and of the first target color.

19 Claims, 7 Drawing Sheets

(51) Int. Cl.
    *B44D 3/00* (2006.01)
    *G06Q 30/0601* (2023.01)
    *G06Q 50/10* (2012.01)

(58) Field of Classification Search
    USPC .............................................................. 8/405
    See application file for complete search history.

(56) References Cited

U.S. PATENT DOCUMENTS

| | | | |
|---|---|---|---|
| 2005/0177032 A1* | 8/2005 | Grossinger | A45D 44/005 600/310 |
| 2007/0222547 A1* | 9/2007 | Stahle | A45D 44/005 336/125 |
| 2014/0082854 A1 | 3/2014 | Landa et al. | |
| 2015/0021356 A1* | 1/2015 | Witchell | B01F 33/848 222/23 |
| 2015/0089751 A1* | 4/2015 | Landa | B65D 83/04 8/405 |
| 2016/0107133 A1 | 4/2016 | Sugino et al. | |
| 2018/0080865 A1* | 3/2018 | Godfrey | G06F 18/22 |
| 2018/0192764 A1* | 7/2018 | Miklatzky | G01N 21/25 |

FOREIGN PATENT DOCUMENTS

| | | |
|---|---|---|
| EP | 3296961 A1 | 3/2018 |
| KR | 20080011374 A | 2/2008 |
| KR | 20140027952 A | 3/2014 |
| TW | 201904471 A | 2/2019 |
| WO | WO 2004/002300 A2 | 1/2004 |
| WO | 2006090363 A1 | 8/2006 |
| WO | WO 2011/024160 A1 | 3/2011 |
| WO | 2012127429 A2 | 9/2012 |

* cited by examiner

METHOD FOR DETERMINING PARAMETERS SPECIFIC TO THE CUSTOM-MADE COLORING OF THE HAIRS OF A GIVEN INDIVIDUAL

CROSS REFERENCE TO RELATED APPLICATIONS

This application is a National Phase filing under 35 U.S.C. § 371 of PCT/EP2020/058417 filed on Mar. 25, 2020; which application in turn claims priority to Application No. 19 03157 filed in France on Mar. 26, 2019. The entire contents of each application are hereby incorporated by reference.

The present invention relates to a method for determining at least one parameter specific to the custom-made coloring of hairs, in particular hair, of a given individual. The present invention also relates to a method for formulating a cosmetic composition specific to the custom-made coloring of hairs, in particular hair, of a given individual. The present invention relates, furthermore, to a method of custom-made coloring of hairs, in particular hair, of a given individual. The present invention also relates to a method for determining a characteristic non-colorimetric parameter of hairs, in particular hair, of a given individual. The present invention further relates to a determination device and an associated formulation system.

Such methods are in particular intended to be implemented in association with a method and a system for hair discoloring/coloring such as described in document EP 0 443 741.

An objective of the cosmetic industry is to improve the experience of its consumers. There is in particular a strong trend to propose products that are increasingly adapted to the needs and characteristics specific to the user. This trend is generally called "customization".

Customizing cosmetic products and services can concern any part of the human body but is of particular interest for exposed body parts, such as the face (makeup or care products, in particular foundations) and the hair (care or coloring products for example).

It is thus known to recommend foundations adapted according to one or more characteristics of the skin of a user (for example "Le Teint Particulier" ® proposed by LANCÔME®). It is also known to propose custom-made hair products of which the composition is determined from different properties of the hair of the user (see for example, the aforementioned document EP 0 443 741, as well as documents WO 2004/002300 A2 and U.S. Pat. No. 9,316, 580 B).

The notion of customization goes beyond the simple fact of offering a more or less wide range of products each corresponding to a user category, a difficulty often being to be able to recommend the product that is best suited for the user according to individual as specific characteristics.

As described in the documents mentioned hereinabove, the notion of customization generally comprises a first step of analysis aiming to obtain one ore more piece of data specific to the user concerned, with this data then being used to determine a suitable treatment and/or one ore more suitable products intended to be applied on the concerned body part of the user.

Until recently, the step of analysis was often conducted manually or visually by an expert such as a hairdresser or a beauty adviser. It is in particular known to have the user fill out a questionnaire whose responses can be used to recommended for them the product that is supposed to be the most suited (see in particular document US 2014/0216492 A). It appears obviously that such a technique is highly uncertain and lacks precision.

With the purpose of improving the relevancy and the reliability of the recommendation of products, one or more steps can be conducted by using tools or devices and can even be automated.

Thus, all or a portion of the initial characteristics specific to a user can be obtained by objective measurements by using a suitable measuring device (generally called a reader). An example of such device is the CAPSURE device marketed by the company X-RITE, with this being designed to return a color code representative of the color of the material measured, for example, the skin of a user (see in particular document US 2010/0328667 A although this document does not explicitly target the skin or the keratin surfaces).

The characteristic data obtained (optionally with other additional data) is then sent to a calculation unit configured to determine the most suitable product according to at least one set of rules, also called application rules.

In the case of foundations or of hair coloring products, the application rules can thus in general consist of a database that records a set of products or compositions, as well as their color rendering according to the skin color on which they are applied. Thus, from the initial skin color of an individual and the final color desired, a software can identify at least one composition that is supposedly adapted (see for example documents U.S. Pat. Nos. 5,478,238 or 9,519,927 that describe methods for finding a suitable foundation product).

Alternatively, or in a complementary manner, the application rules can use one or more color rendering models that comprise one or more mathematical formulas. Mention can be made of the 'Color iMatch'® software marketed by the company X-RITE and which makes it possible in particular to formulate compositions of paint.

Mention can also be made of the Kubelka-Munk relationship which makes it possible as to predict the color of a mixture of colorants from spectral diffusion and absorption parameters of each one of the components. An iterative approach, in particular in association with pre-recorded reference compositions, makes it possible to obtain a composition that normally makes it possible to obtain the final color desired.

The treatment or product determined in accordance with the personal data collected can be a final product already formulated and selected in a catalog or a database (see for example aforementioned documents U.S. Pat. Nos. 5,478, 238 and 9,519,927) or a custom-made product of which the composition itself was determined from individual characteristics obtained.

The product can then be purchased or ordered by the person. In the case of a custom-made product, said product can be manufactured directly at the point of sale (boutique or salon for example) by a device able to mix components in accordance with the determined customized composition, and distribute said composition. The custom-made product can also be ordered by the user and delivered later.

For a complete example of such a system, reference can be made to aforementioned document U.S. Pat. No. 9,316, 580 B that describes a method for conducting a custom-made treatment of the hair of a user comprising a step of diagnosis using an optical measurement device configured to acquire the spectrum of the hair, this spectrum then being used to calculate a suitable composition, with the composition then being manufactured and distributed by a corresponding device. Reference can also be made to document WO 2011/024160 A.

As mentioned hereinabove, obtaining reliable, objective and relevant initial data is often a challenge. This is particularly the case for the hair due to its texture and specific environment.

Despite all the care given in determining the initial parameters, application rules and/or color prediction models, the final result obtained on the individual concerned can substantially move away from the desired final result.

In particular, when an individual wants to color their hairs. In particular their hair, the cosmetic product to be applied on the hair of the individual with the purpose of carrying out the coloring is usually selected according to the initial color of the hair of the individual and the target color desired by the individual.

However, once the cosmetic product is applied on the hair of the individual, the color actually obtained does not generally correspond to the target color.

This can be explained by the fact that, from one individual to another, the hair is of different natures and different experiences, in particular in terms of undergone stress as (preceding colorings for example) or aging. Certain parameters that can influence the final result can thus not be measurable/measured or not be directly taken into account in the application rules and/or the colorimetric rendering model. Such differences impact the rendering of the color once the cosmetic product is applied on the hair.

There is therefore a need for a process and an associated device that makes it possible to go further in the degree of customization, in particular in the particular case of hair coloring.

For this purpose, the object of the present description is a method for determining at least one parameter specific to the custom made coloring of hairs, in particular hair, of a given individual, according to a colorimetric rendering model, with the method comprising an initialization phase corresponding to a first coloring of the hairs of the individual, the initialization phase comprising the steps of:
receiving at least one magnitude representative of a first target color in a colorimetric space,
receiving at least one magnitude representative of a first initial color in the colorimetric space, the first color being the color of the hairs to be colored of the individual.
determining a cosmetic product composition according to the magnitudes representative of the first initial color and of the first target color and of the colorimetric rendering model.
applying a cosmetic product having the determined composition on the hairs to be colored of the individual in order to obtain colored hairs,
evaluating the color of the colored hairs in order to obtain at least one magnitude representative of a first final color in the colorimetric space, and
determining at least one colorimetric deviation parameter specific to the individual according to the magnitudes representative of the first final color and of the first target color.

According to particular embodiments, the determination method comprises one or several of the following characteristics taken in isolation or in any technically possible combination:
the method comprises a step of memorizing the colorimetric deviation parameter as historical data specific to the given individual;

the method comprises a customization phase corresponding to a second coloring of the hairs of the individual, the customization phase comprising the steps of
receiving at least one magnitude representative of a second target color in the colorimetric space,
receiving at least one magnitude representative of a second initial color in the colorimetric space, the second color being the color of the hairs to be colored of the individual,
determining a cosmetic product composition according to the magnitudes representative of the second initial color and of the second target color, of the colorimetric rendering model and of the colorimetric deviation parameter determined during the initialization phase;
the customization phase comprises:
a step of applying a cosmetic product having the determined composition on the hairs to be colored of the individual in order to obtain colored hairs, and
a step of evaluating the color of the colored hairs in order to obtain at least one magnitude representative of a second final color in the colorimetric space;
the customization phase comprises an updating phase, where applicable, of the colorimetric deviation parameter specific to the individual according to the magnitudes representative of the second final color and of the second target;
the customization is repeated for each new coloring of the hairs of the given individual according to at least the last colorimetric deviation parameter determined;
the time interval between two successive customization phases is at least one week, preferably at least three weeks.

The present description also relates to a method for formulating a cosmetic composition specific to the custom-made coloring of hairs, in particular hair, of a given individual according to a colorimetric rendering model, the method comprising the steps of:
receiving at least one colorimetric deviation parameter specific to the given individual, said parameter being able to be obtained by a determination method such as described hereinabove,
receiving at least one magnitude representative of a first target color in a colorimetric space,
receiving at least one magnitude representative of a first initial color in the colorimetric space, the first color being the color of the hairs to be colored of the individual,
determining a cosmetic product composition according to the magnitudes representative of the first initial color and of the first target color, of the colorimetric rendering model and of the colorimetric deviation parameter specific to the individual, and
manufacturing a cosmetic product having the determined composition.

The present description further relates to a method of custom-made coloring of hairs, as in particular hair, of a given individual, the coloring method comprising a step of applying a cosmetic composition on the hair of the individual, the cosmetic composition having been formulated according to the formulation method such as described hereinabove.

The description also relates to a method for determining at least one characteristic non-colorimetric parameter of hairs, in particular hair, of a given individual, the method including steps of:

receiving a colorimetric deviation parameter specific to the given individual, said parameter being able to be obtained by a determination method such as described hereinabove, and determining at least one characteristic non-colorimetric parameter of the hairs of the given individual from the colorimetric deviation parameter received.

According to particular embodiments, the determination method comprises one or several of the following characteristics taken in isolation or in any technically possible combination:

the or at least one non-colorimetric parameter is selected from the group consisting of: a permeability factor of the hairs of the individual, a rising factor of each colorant of the cosmetic product in the hairs of the individual, a resistance to oxidation of the hairs of the individual and a relationship between the eumelanin contained in the hairs of the individual with the pheomelanin contained in the hairs of the individual.

The description also relates to a device for determining at least one parameter specific to the custom-made coloring of hairs, in particular hair, of a given individual, according to a colorimetric rendering model, the device being configured to implement at least one determination method such as described hereinabove, the device comprising a controller comprising:

a man-machine interface configured to implement each receiving step of the determination, and a processing configured to implement at least the steps of determining a composition and of determining at least one deviation parameter.

The description further relates to a system for formulating a cosmetic composition specific to the custom-made coloring of hairs, in particular hair, of a given individual, the system being configured to implement a formulation method such as described hereinabove, the system comprising a plurality of functional cosmetic mixtures stored in separate containers, the functional cosmetic mixtures being able to be combined with one another in order to form the cosmetic composition determined, the system being configured to distribute at least two functional cosmetic mixtures, each one in a determined proportion as and/or a quantity.

Other characteristics and advantages of the invention will appear when reading the following description, embodiments of the invention, provided solely as an example and with reference to the drawings which are.

In the rest of description, the term "hairs" designates all the types of hairs of an individual regardless of their location on the body surface of the individual. Hairs encompass the hair system of the individual. The hair and the eyebrows are examples of hairs. The present application however aims more particularly the hair.

In general, the term "cosmetic product" designates any substance or mixture intended to be placed in contact with surface portions of the human body (the epidermis, hair system, nails, lips and external genital organs), or with the teeth and the mucous membranes of the oral cavity with a view exclusively or mainly of cleaning them, perfuming them, modifying the aspect of them, protecting them, maintaining them in good condition or correcting body odors.

For example, the cosmetic product is a coloring formula, also called 'coloring', intended to be placed in contact with hairs of an individual, such as hair, in order to color them. Such a coloring is permanent or temporary. The present application aims in particular so-called oxidation colorings.

The term "color" for a cosmetic product designates the apparent color or the as rendering of the color once the cosmetic product is applied on the hairs of a reference individual or on a hair model. Given the differences in the nature and experience of the hairs from one individual to another, the rendering of the color can vary once the cosmetic product is applied on the hairs of a given individual with respect to the rendering obtained for the reference individual or the hair model.

Figure 1:
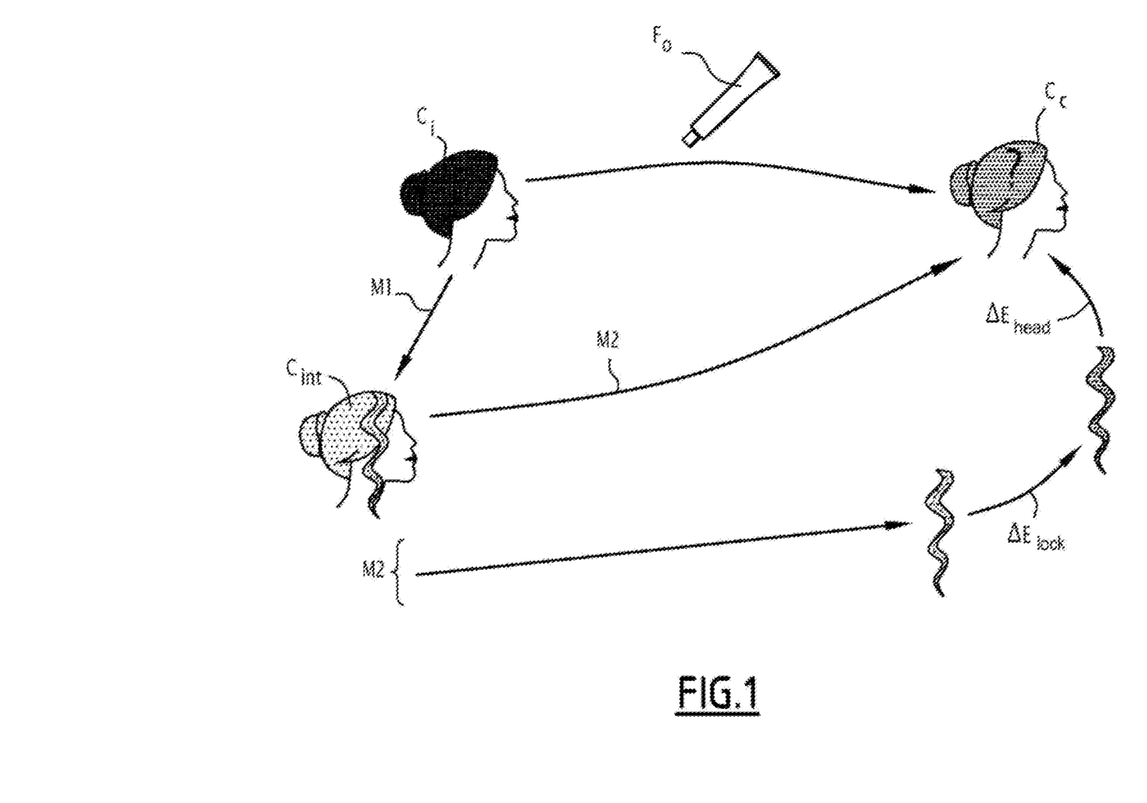
FIG. 1 is a diagrammatic view of the principal of a method for determining a parameter specific to the custom-made coloring of the hair of a given individual.
Figure 2:
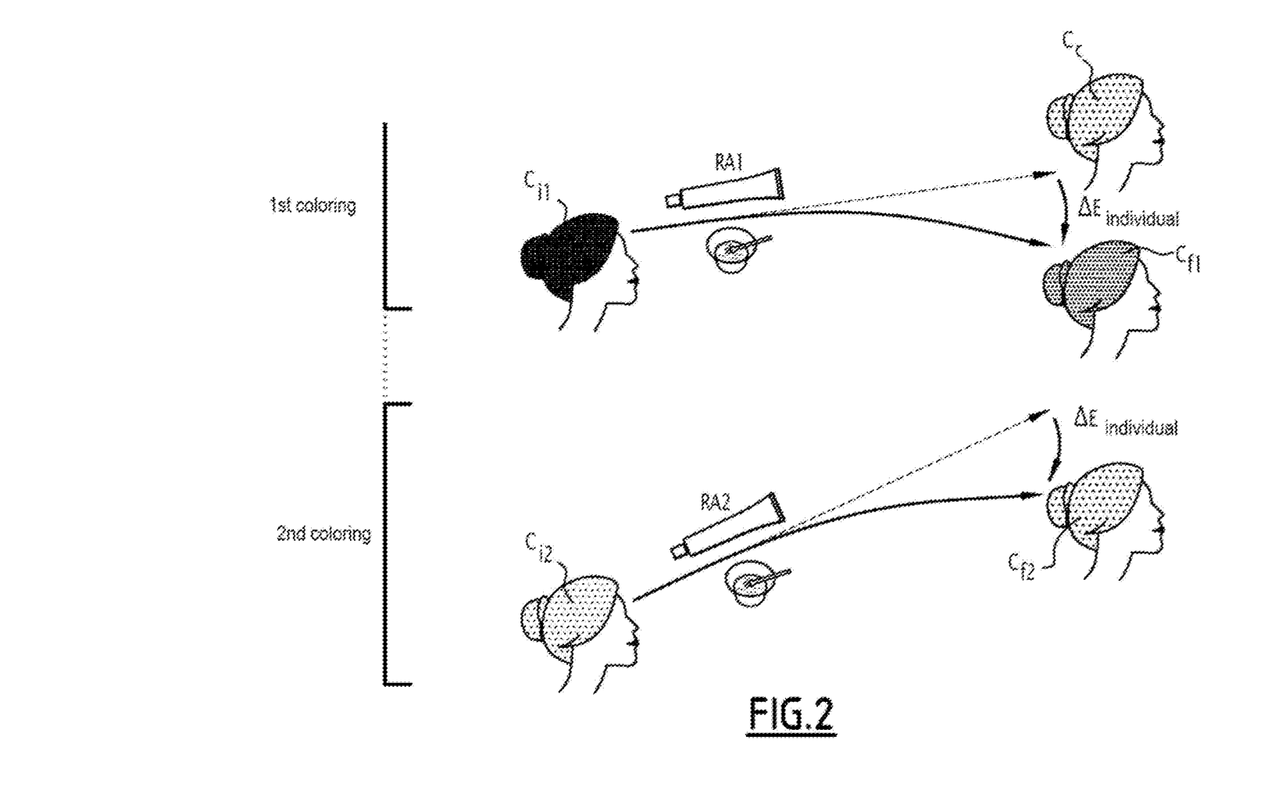
FIG. 2 is another diagrammatic view of the principal of a method for determining a parameter specific to the custom-made coloring of the hair of a given individual.
Figure 3:
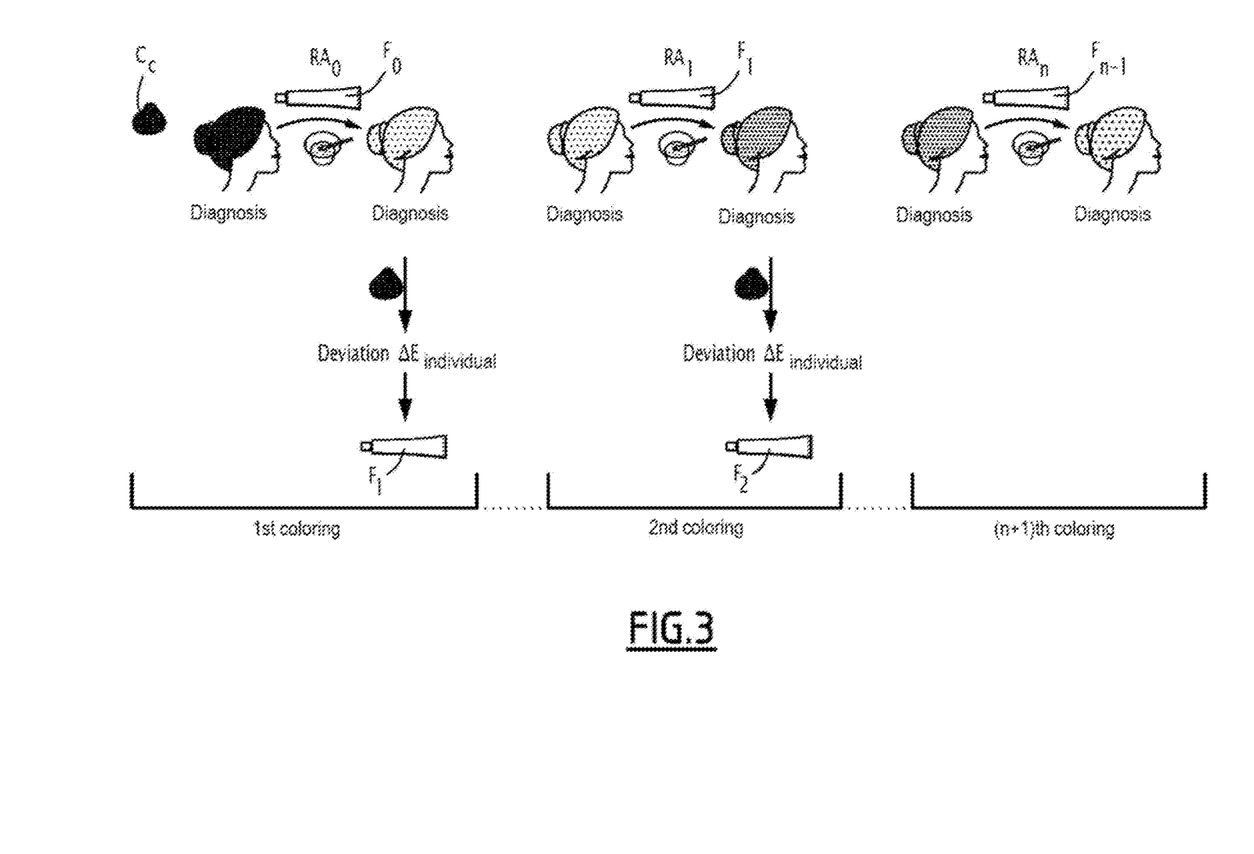
FIG. 3 is a yet another diagrammatic view of the principal of a method for determining a parameter specific to the custom-made coloring of the hair of a given individual.

The general principle of the invention that will be developed in the rest of the description is illustrated in FIGS. 1 to 3 in the case of hair.

In particular, FIG. 1 shows a given individual having an initial hair color $C_i$ and who wants, after application of a cosmetic composition $F_0$, to obtain a target color $C_c$, different from the initial color $C_i$, the challenge consists of determining the composition $F_0$ of cosmetic product that is most suited to the given individual in order to obtain, after coloring, a final color $C_f$ that is as close as possible to the target color $C_c$. The term "as close as possible" means that the desired colorimetric deviation between the final color $C_f$ and the target color $C_c$ in the colorimetric space CIE L*a*b is as low as possible, and in particular less than 3, even less than 1.

The cosmetic composition $F_0$ is obtained via a set of application rules that implement one or more colorimetric rendering models that make it possible to determine the cosmetic product composition that is supposedly the best suited for the obtaining of the target color $C_c$ starting from the initial color $C_i$. More precisely, the colorimetric rendering model or models make it possible to obtain a final color $C_f$ according to the target color $C_c$ and the initial color $C_i$. The application rules make it possible to obtain a cosmetic product composition that corresponds to the final color $C_f$ determined. The method presented in the rest of the description aims to customize the colorimetric rendering model for each individual through successive colorings.

According to the cosmetic composition $F_0$ determined, a professional such as a hairdresser, carries out where applicable mixtures of cosmetic compositions in order to obtain the determined cosmetic composition $F_0$. The determined cosmetic composition $F_0$ will thus be obtained by a specific application rule. The application rule is however specific to the desired final color but not to a given individual.

In particular, FIG. 1 describes the use of colorimetric rendering models M1 and M2 to determine the cosmetic product composition that is supposedly the best suited for the obtaining of the target color $C_c$, optionally by calculating an intermediate color $C_{int}$. Such models are, for example, based on optical models such as the Kubelka-Munk model and on chemical models or statistical models. The colorimetric rendering models M1. M2 can also comprise a set of vivo and/or vitro tests grouped into a database and making it possible as to allow correspondences to be made between the initial color and the target color, with the application rules providing the correspondence between the target color and the composition As shown in FIG. 1 for the colorimetric rendering model M2, such modelings can be adapted to take account of certain deviations $\Delta E_{look}$ (Also called pivot points on samples) between, on the one hand, the color predicted by the model and, on the other hand, the experimental color obtained once the coloring applied on the samples of locks of hair. Such modelings make it possible, also, to take account of the deviations $\Delta E_{head}$ (also called pivot point on head) between, on the one hand, the final color obtained experimentally on samples of locks of hair and, on the other hand, the final color obtained experimentally once the coloring applied on hair models (all of the hair).

As can be seen in FIG. 2, the pivot point on head $\Delta E_{head}$ is a parameter that depends on the hair of the individual (nature and experience). The methods described in what follows aim to customize the pivot point on head in such a way as to apply a different correction for each individual through colorings. Initially, during the first coloring of the hair of the individual, the pivot point on head is taken into account in the colorimetric rendering model or models based on that of a reference individual. The arrows as a dotted line illustrate the color (target color) targeted by the colorimetric rendering model and carried out by a mixture of compositions according to application rules RA1. The arrows illustrate the color effectively obtained (final color). Thus, during the first coloring, the final color $C_{f1}$ is different from the target color $C_c$ by a deviation corresponding to the pivot point on head specific to the individual $\Delta E_{individual}$ (individual pivot point). During the following coloring, the deviation $\Delta E_{individual}$ obtained taken into account in the colorimetric rendering model, which makes it possible to obtain via new application rules RA2 a final color $C_{f2}$ that is closer to the target color $C_c$ than the final color $C_{f1}$ obtained hereinabove.

FIG. 3 shows that the individual pivot point $\Delta E_{individual}$ is updated during successive colorings to correspond to a cosmetic composition that makes it possible to come increasingly closer to the target color.

Devices, systems and methods that illustrate such a principle shall now be described.

Figure 4:
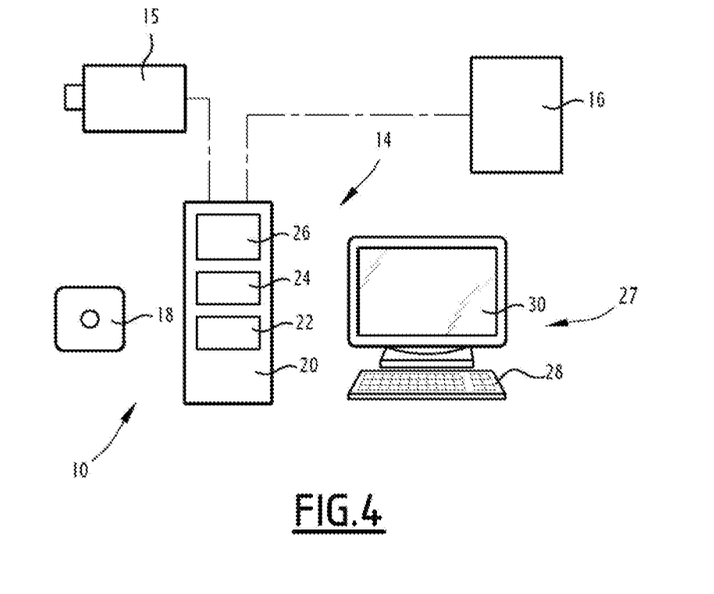
FIG. 4 is a diagrammatic view of a determination device.

A device 10 for determining parameters specific to the custom-made coloring of the hairs of a given individual is illustrated in FIG. 4.

The device 10 comprises a controller 44 and, optionally, a colorimetric measuring unit 15 and a manufacturing unit 16.

The controller 14 is able to interact with a computer program product 18. The as interaction of the computer program product 18 with the controller 14 makes it possible to implement a method for determining at least one parameter specific to the custom-made coloring of the hairs of a given individual. Advantageously, the device 10 is, also, configured to determine at least one characteristic non-colorimetric parameter of hairs, in particular hair, of a given individual, such as shall be described in the rest of the description.

The controller 14 is a computer. More generally, the controller 14 is an electronic computer capable of manipulating and/or transforming data represented as electronic or physical quantities in registers of the controller 14 and/or memories into other similar data corresponding to physical data in memories, registers or other types of display, transmission or storage devices.

The controller 14 comprises a processor 20 including a processing unit 22, memories 24, and an information support drive 26. In the example shown in FIG. 4, the controller 14 comprises, also, a man-machine interface 27 comprising, for example, a keyboard 28 and/or touch interface and a display unit 30.

The computer program 18 comprises a legible information support. A legible information support is a support that can be read by the controller 14, usually by the processing unit 22 of the controller 14. The legible information support is a medium capable of memorizing electronic instructions and capable of being coupled to a bus of a computer system.

For example, the legible information support is a diskette or floppy disk, an optical disk, a CD-ROM, a magneto-optical disk, a ROM memory, a RAM memory, an EPROM memory, an EEPROM memory, a magnetic card or an optical card.

A computer program containing program instructions is stored on the legible information support. The computer program can be loaded onto the data processing unit 22 and is suitable for driving the implementation of at least one of the steps of a method for determining at least one parameter specific to the custom-made coloring of hairs of a given individual, of which an example shall be given in the rest of the description. Advantageously, the computer program is, also, suitable for driving the implementation of a method for determining at least one characteristic non-colorimetric parameter of the hairs of a given individual, such as shall be described in the rest of the description.

The colorimetric measuring unit 15 is able to measure the color of the hairs of the individual.

The colorimetric measuring unit 15 is, for example, a spectro-colorimeter.

According to an embodiment, the colorimetric measuring unit 15 comprises a measurement sensor able to take images of zones of hairs of the individual and an analysis as tool making it possible to extract the colorimetric measurements from the images obtained.

Alternatively or in a complementary manner, the colorimetric measuring unit 15 can also be a unit that allows for a manual entry of the color by the individual and/or their hairdresser, in particular from a colorimetric scale shown in particular on a screen, in particular a touchscreen. The user selects on the screen the color of the hairs of the individual, the value of said color being transmitted to the processing unit 14.

Generally, the colorimetric measuring unit 15 can be any unit that makes it possible to obtain colorimetric information.

The manufacturing unit 16 is capable of manufacturing a cosmetic product from a given composition.

Figure 5:
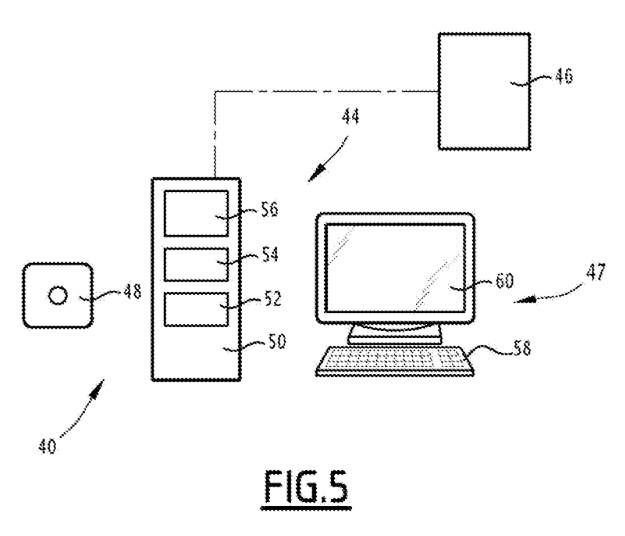
FIG. 5 is a diagrammatic view of a formulation system.

A system 40 for formulating a cosmetic composition specific to the custom-made coloring of the hairs of a given individual is shown in FIG. 5.

The system 40 comprises a controller 44 and a manufacturing unit 46.

The controller 44 is able to interact with a computer program product 48. The interaction of the computer program product 48 with the controller 14 and the manufacturing unit 46 makes it possible to implement a method for formulating a cosmetic composition specific to the custom-made coloring of the hairs of a given individual.

The controller 44 is a computer. More generally, the controller 44 is an electronic computer capable of manipulating and/or transforming data represented as electronic or physical quantities in registers of the controller 44 and/or memories into other similar data corresponding to physical data in memories, registers or other types of display, transmission or storage devices.

The controller 44 comprises a processor 50 including a processing unit 52, memories 54, and an information support drive 56. In the example shown in FIG. 5, the controller 44 comprises, also, a man-machine interface 57 comprising, for example, a keyboard 58 and/or touch interface and a display unit 60.

The computer program 48 comprises a legible information support. A legible information support is a support that can be read by the controller 44, usually by the processing unit 52 of the controller 44. The legible information support is a medium capable of memorizing electronic instructions and capable of being coupled to a bus of a computer system.

For example, the legible information support is a diskette or floppy disk, an optical disk, a CD-ROM, a magneto-optical disk, a ROM memory, a RAM memory, an EPROM memory, an EEPROM memory, a magnetic card or an optical card.

A computer program containing program instructions is stored on the legible as information support. The computer program can be loaded onto the data processing unit 52 and is suitable for driving the implementation of at least one of the steps of a method for formulating a cosmetic composition, of which an example shall be given in the rest of the description.

The manufacturing unit 46 comprises, advantageously, a plurality of functional cosmetic mixtures stored in separate containers. The functional cosmetic mixtures are, for example, components that in particular integrate pigments. The mixtures are able to be combined together to form a cosmetic product having a determined composition.

The system 40 is configured to distribute and makes at least two cosmetic mixtures, each one in a determined proportion and/or quantity in order to obtain a determined cosmetic composition.

In an example embodiment, the system 40 and the device 10 are integrated into the same machine, in such a way that the manufacturing unit 16 of the device 10 is confounded with the manufacturing unit 46 of the system 40 and/or the controller 14 of the device 10 is confounded with the controller 44 of the system 40.

Figure 6:
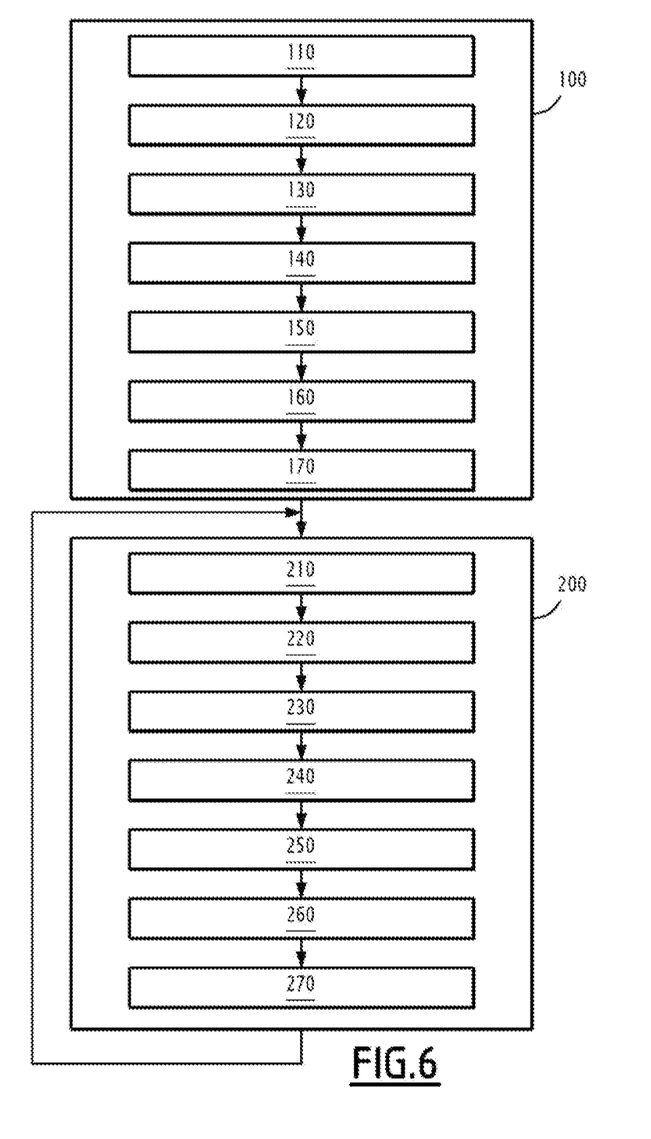
FIG. 6 is a flow chart of an example of implementing a method for determining a parameter specific to the custom-made coloring of the hairs of a given individual.

An example of the operation of the determination device 10 is now described in reference to the flowchart of FIG. 6.

In the example shown in FIG. 6, the determination method comprises two phases: an initialization phase 100 corresponding to a first coloring of the hairs of a given individual and a customization phase 200 corresponding to a second coloring of the hairs of the given individual and using an individual deviation parameter determined during the initialization phase.

The customization phase 200 is, advantageously, repeated for each new coloring of the hairs of the given individual. The time interval between two successive customization phases D is advantageously at least one week, preferably at least three weeks, even at least six weeks.

The initialization phase 100 comprises a step 110 of receiving at least one magnitude representative of a first target color in a colorimetric space. The receiving step 110 is implemented via the man-machine interface 27 of the controller 14.

The first target color is the color of the coloring desired for the hairs to be colored of the individual, i.e. the colorimetric rendering desired after application of a cosmetic product on the hairs of the individual.

The first target color is typically a color selected by the individual, optionally with the advice of a professional, such as a hairdresser. The first target color is, for example, selected using a color scale.

In the rest of the option, the colorimetric values are presented in the CIE L*a*b* colorimetric space.

The CIE L*a*b* color space, often abbreviated CIELAB, is a color space for surface colors defined by the International Commission on Illumination (CIE) in 1976. It is based on evaluations of the CIE XYZ system, and abandons linearity to more accurately show up differences between colors perceived by the human eye. Three magnitudes characterize colors in this model, namely the lightness L* derived from the luminance (Y) of the XYZ evaluation, and two parameters a* and b* that express the color difference from the color of a gray surface with the same lightness, as the chrominance. The definition of a gray, uncolored, achromatic surface implies that the composition of the light that illuminates the colored surface is explicitly indicated. This illuminant is often daylight corresponding to the D65 normalized standard.

Any other color space could be envisaged.

More generally, any representations making it possible to associate spectra could also be used in this context.

It is assumed in the following that the data received are colorimetric values.

In the case where the data received are not colorimetric values, a conversion step is implemented during each step of receiving magnitudes representative of colors.

The initialization phase 100 comprises a step 120 of receiving at least one magnitude representative of a first initial color in the colorimetric space. The receiving step 110 is implemented via the man-machine interface 27 of the controller 14.

The first initial color is advantageously different from the first target color.

Alternatively, for example to mask white hair, the first initial color is identical to the first target color.

Preferably, the first initial color is the current color of the hairs to be colored of the individual, i.e. the color of the hairs of the individual at the time of the first coloring, but before the application of a cosmetic product having a coloring function.

The first initial color is, typically, obtained by a measurement taken by a sensor, such as a spectro-colorimeter. The measurements are, for example, colorimetric measurements taken on one or several zones of hairs of the individual. For example, such colorimetric measurements are taken by a professional, such as a hairdresser. As indicated hereinabove, the magnitude representative of the initial color can thus be received directly or indirectly from a colorimetric measuring device and/or be entered or validated manually by the user or their hairdresser.

For the purposes of illustration, the professional users a portable spectrometer or the measurement unit 15 of the device 10.

According to an embodiment, the professional takes measurements on a number of zones of hairs greater than or equal to three. In the case of hair, this makes it possible to take account of the variations in color of the hair (typically the tips of the hair are often lighter than the roots, as well as white hair).

According to another embodiment, the professional takes measurements on only one zone of hairs, corresponding, for example, to the skull of the individual.

The initialization phase 100 comprises a step 130 of determining a cosmetic product composition according to the magnitudes representative of the first initial color and of the first target color and of a colorimetric rendering model, optionally associated with application rules.

The determination step 130 is implemented by the controller 14 with interaction with the computer program product 18, i.e. is implemented by computer.

The colorimetric rendering model and/or the application rules are, for example, memorized in the memory 24 of the controller 14 or on a server that can be accessed by the determination device 10.

Typically, the colorimetric rendering model is a generic model that is not customized for the given individual.

The colorimetric rendering model is a correspondence function which, from a target color and an initial color, associates a cosmetic product color (final color). This means that the image by the colorimetric rendering model of a target color and of an initial color of the individual is a cosmetic product color. The cosmetic product color determined is such that the application thereof on the hairs of the individual makes it possible to obtain a rendering that is compliant with the target color. The application rules make it possible to determine a cosmetic product composition that makes it possible to obtain the final color determined.

The colorimetric rendering model is, for example, obtained from the Kubelka-Munk model which makes it possible to predict the color of a mixture of pigments applied on a colored surface from spectral diffusion and absorption parameters of each one of the pigments. The application rules implement, for example, an iterative approach, in particular in association with pre-recorded reference compositions, in order to obtain a composition that normally makes it possible to obtain the desired target color (without however taking account of the variations specific to the given individual).

Note that the Kubelka-Munk model is a model that is applied in a uniform, continuous as medium, and in a main diffusion regime, such as paints or foundations, but which is not usual for coloring products, in particular hair. Indeed, coloring products comprise colorants that once applied on the hair penetrate into the fiber of the hair, which is not the case with products applied in layers, such as a foundation. In addition, all of the colored fibers do not form a homogeneous and continuous medium. Also, using the Kubelka-Munk model in the case of hair coloring appears specific. The need for custom made correction is all the more so important.

The Kubelka-Munk model is a particular example of a colorimetric model and those skilled in the art will understand that any other colorimetric model can be used to determine the composition of the cosmetic product corresponding to the first initial color and to the first target color.

Advantageously, the colorimetric rendering model integrates average values of pivot point on samples and of pivot points on head. On the other hand, such pivot points are not customized for the given individual.

As the colorimetric rendering model is a usual model for those skilled in the art and that can fall under their know-how, no further details of it will be provided in the present description.

In an embodiment, a cosmetic product having the determined composition is selected from a set of cosmetic products. For example, the selected cosmetic product is the cosmetic product of which the color is the closest to the color obtained at the output of the colorimetric rendering model.

In another embodiment, the determined cosmetic composition is manufactured according to the color obtained at the output of the colorimetric rendering model and the application rules, for example, via the manufacturing unit 16. The application rules then make it possible to determine mixtures of cosmetic compositions that make it possible to obtain the determined color layer in order to have, after application, the desired colorimetric rendering.

The determination method comprises a step 140 of applying a cosmetic product having the determined composition on the hairs of the individual in order to obtain colored hairs.

The application step 140 is, for example, carried out by a professional, such as a hairdresser. Alternatively, the application step 140 is carried out by the individual themselves.

In an embodiment, when the hairs are hair, all of the hair of the individual is covered with the cosmetic product which makes it possible to obtain a uniform coloring.

In another embodiment, when the hairs are hair, only a portion of the hair is covered with the cosmetic product, which makes it possible to obtain hair of various colors.

The initialization phase of 100 comprises a step 150 of evaluating the color of the colored hairs in order to obtain at least one magnitude representative of a first final color. The first final color is therefore the color of the hairs of the individual after application of the cosmetic product on the hairs, once the coloring process is completed.

Typically, the evaluation is carried out at the end of the, i.e. at least after an impregnation time of the cosmetic product on the hairs, followed by the rinsing of the hairs in order to remove the cosmetic product.

The evaluation step 150 is, for example, implemented by the colorimetric measuring unit 15.

Alternatively, the evaluation step 150 is carried out manually, by the individual themselves or by a specialist, by comparison of the color of the colored hairs with a color scale.

The initialization phase 100 comprises a step 160 of determining, according to the magnitudes representative of the first final color and of the first target color, of at least one colorimetric deviation parameter specific to the individual.

The determination step 160 is implemented by the controller 14 with interaction with the computer program product 18, i.e. is implemented by computer.

The colorimetric deviation parameter is a component that makes it possible to return to the pivot point of the individual.

The colorimetric deviation parameter is used to modify the colorimetric rendering model, for example, by adding weightings or corrections. This makes it possible in particular to determine during a later coloring, a cosmetic product of which the rendering should be more adapted to the specific hairs of the given individual.

The colorimetric deviation parameter is according to at least one magnitude representative of the colorimetric space. For example, in the space CIE L*a*b, the deviation parameter is according to at least one of the lightness L. of the parameter a* and of the parameter b*.

Advantageously, the colorimetric deviation parameter takes account of all of the magnitudes representative of the colorimetric space, i.e. the lightness L, the parameter a* and the parameter b* for the space CIE L*a*b. The colorimetric deviation parameter is, for example, obtained using the following expression (1):

$$\Delta E = \sqrt{(\Delta L^*)^2 + (\Delta a^*)^2 + (\Delta b^*)^2} \quad (1)$$

Where:
- ΔE designates the colorimetric deviation parameter, also called error or difference, between the first target color and the first final color,
- ΔL* is the difference between the lightness of the first target color and the lightness of the first final color in the space CIE L*a*b,
- Δa* is the difference between the parameter a* of the first target color and the parameter a* of the first final color in the space CIE L*a*b, and
- Δb* is the difference between the parameter b* of the first target color and the parameter b* of the first final color in the space CIE L*a*b.

In an embodiment, the colorimetric deviation parameter is obtained by taking account of the colorimetric deviations between a target color and a final color obtained for the given individual during prior colorings. In this case, the colorimetric deviation parameter is, for example, a cumulative average of the prior deviations and of the current deviation between the first target color and the first final color.

According to another embodiment, the colorimetric deviation parameter is obtained by taking account of the colorimetric deviations between a target color and a final color obtained for a panel of individuals. For example, the colorimetric deviation parameter is the difference between, a colorimetric deviation between the first target color and the first final color obtained for the given individual, and on the other hand, a corresponding deviation resulting from the average of the deviations obtained for a set of individuals, after application on the hairs of individuals of a cosmetic product aiming to obtain the corresponding target color. The colorimetric rendering model forms, for example, a learning model of which the database is updated using the deviation parameter determined for the given individual. This embodiment aims to highlight the offset between the final color obtained for the individual and the average final color obtained for a set of individuals. The specific characteristics of the given individual are, thus, modeled relatively to a reference individual.

Advantageously, the initialization phase 100 comprises a step 170 of memorizing each parameter determined as historical data specific to the given individual.

Advantageously, each determined parameter is memorized in a file, in particular a computer file, specific to the given individual The file specific to the individual, is for example, memorized in a memory 24 of the determination device 10 or on a server that can be accessed by the determination device 10. Thus, the information contained in the computer file can be accessed easily during a later coloring of the given individual.

Optionally, according to the determined parameters, the initialization phase 100 comprises a diagnosis and advising step. During this step, a professional will, for example, according to the determined parameters, recommend different products to care for the colored hairs of the given individual.

The customization phase 200, also called adjustment or individualization phase, corresponds to a second coloring of the hairs of the given individual.

The customization phase 200 comprises a step 210 of receiving at least one magnitude representative of a second target color in the colorimetric space.

The receiving step 210 is, for example, identical to the receiving step 110 of the initialization phase 100 by replacing the first target color with the second target color.

Advantageously, the colorimetric difference between the second target color and the first target color in the colorimetric space CIE L*a*b his less than 4, preferably less than 3, even less than 1. Thus, the target colors are relatively close, which makes it possible, according to the parameters obtained during the preceding phase, to obtain better results in terms of color rendering.

The customization phase 200 comprises a step 220 of receiving at least one magnitude representative of a second initial color in the colorimetric space.

The receiving step 220 is, for example, identical to the receiving step 120 of the initialization phase 100 by replacing the first initial color with the second initial color.

The customization phase 200 comprises a step 230 of determining a cosmetic product composition according to magnitudes representative of the second initial color and of the second target color, of the colorimetric rendering model, optionally associated with application rules, and the parameter or parameters obtained during the preceding phase (initialization phase), for example, the parameter or parameters memorized in the file specific to the given individual.

The determination step 230 is implemented by the controller 14 with interaction with the computer program product 18, i.e. is implemented by computer.

The determination step 230 is, for example identical to the determination step 130 of the initialization phase 100 by replacing the first initial color with the second initial color, the first target color with the second target color, and the colorimetric rendering model with the colorimetric rendering model modified according to the parameter or parameters obtained during the preceding phase (initialization phase). Thus, during the determination step 230, the colorimetric rendering model is customized from the parameters specific to the given individual.

The customization phase 200 comprises, optionally, a step 240 of applying a cosmetic product having the determined composition on the hairs to be colored of the individual in as order to obtain colored hairs.

The application step 240 is, for example, identical to the application step 140 of the initialization phase 100.

The customization phase 200 comprises, optionally, a step 250 of evaluating the color of the colored hairs in order to obtain at least one magnitude representative of a second final color in the colorimetric space.

The evaluation step 250 is, for example, identical to the evaluation step 150 of the initialization phase 100.

The customization phase 200 comprises, optionally, a step 260 of updating the colorimetric deviation parameter determined during the initialization phase according to the magnitudes representative of the second final color and of the second target color.

The updating step 260 comprises for example a step of determining at least one colorimetric deviation parameter specific to the given individual, according to the magnitudes representative of the second final color and of the second target color. Such a determination step is, for example identical to the determination step 160 of the initialization phase 100 by replacing the first initial color with the second initial color, the first target color with the second target color, and the colorimetric rendering model with the colorimetric rendering model modified according to the parameter or parameters obtained during the preceding phase (initialization phase).

The customization phase 200 comprises, optionally, a step 270 of memorizing the determined colorimetric deviation parameter, for example as new history data or as a replacement for the preceding history data. All of the history data forms a history specific to the given individual.

In another example, the memorization step 270 consists of an update of the specific file of the individual according to new determined parameters. The newly determined parameter is, for example, added to the file or replaces one or more parameters already memorized in the file. Optionally, calculations such as averages of memorized parameters can also be memorized in the file.

In yet another example, the newly determined parameter is memorized in the learning base of the colorimetric rendering model.

Advantageously, the steps of the customization phase 200 are then repeated for each new covering of the hairs of the given visual, with the first target color then corresponding to the second preceding target color, the second target color then corresponding to the new second target color and the colorimetric deviation parameter considered being the colorimetric deviation parameter obtained during the preceding customization phase or a set of colorimetric deviation parameters obtained previously of which the last colorimetric deviation parameter obtained.

Thus, the determination method, by the determination of deviation parameters, makes it possible to take account of the history of the given individual in order to appropriately modify the colorimetric rendering model, and thus obtain a custom-made coloring. This makes it possible to obtain a color rendering that is more reliable for the individual carrying out a coloring. Later customization phases benefit from this customization.

Advantageously, the device 10 is also configured to implement a method for determining at least one characteristic non-colorimetric parameter of hairs particular hair, of a given individual.

The or each non-colorimetric parameter is a parameter that characterizes the hairs of the individual and which is not expressed in the form of a colorimetric value.

Advantageously, the or at least one non-colorimetric parameter is selected from the group consisting of: a permeability factor of the hairs of the individual, a rising factor of each colorant of the cosmetic product in the hairs of the individual, a resistance to oxidation of the hairs of the individual and a relationship between the eumelanin contained in the hairs of the individual with the pheomelanin contained in the hairs of the individual.

The method for determining a non-colorimetric parameter comprises a step of receiving a colorimetric deviation parameter specific to the given individual. The colorimetric deviation parameter is, for example, obtained via a method for determining a deviation parameter such as described hereinabove.

The determination method comprises a step of determining at least one characteristic non-colorimetric parameter of the hairs of the given individual according to the colorimetric deviation parameter received. The non-colorimetric parameters are, for example, obtained by a machine learning method.

Determining non-colorimetric parameters makes it possible to obtain information on the properties of the hair, and thus to adapt the care provided to the hair or the type of cosmetic products to be applied on the hair in order to color it.

As an example, a color obtained that is darker on the given individual with respect to a reference individual can come from a higher porosity of the hairs of the given individual.

According to an embodiment, at least one determined non-colorimetric parameter is used to determine modifications of the colorimetric rendering model, for example, by application of a waiting or corrections.

Taking account of non-colorimetric parameters specific to the given individual in as order to modify the colorimetric rendering model used in the preceding determination method makes it possible to better adapt colorimetric rendering model to the specific characteristics of the hairs of the given individual. Thus the colorimetric rendering model according to the nature of the hairs of the individual, the history of the hairs of the individual, as well as application characteristics of the cosmetic product. The application characteristics are, for example, the quantity of cosmetic product applied on the hairs of the individual, the duration of placing the cosmetic product on the hairs of the individual or more generally are due to the gestures of the professional carrying out the coloring of the hairs of the individual.

Figure 7:
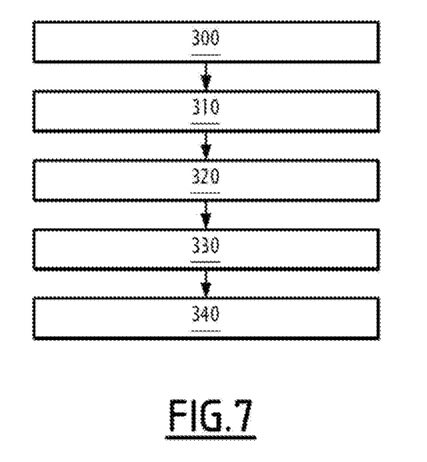
FIG. 7 is a flow chart of an example of implementing a method for formulating a cosmetic composition specific to the custom-made coloring of the hairs of a given individual.

An example of the operation of the system 40 is now described in reference to the flowchart of FIG. 7 which shows the steps of a formulation method.

The formulation method comprises a step 300 of receiving at least one colorimetric deviation parameters specific to the given individual. The receiving step 300 is implemented via the man-machine interface 57 of the controller 44.

The colorimetric deviation parameter is, for example, obtained after implementation of a determination method such as described hereinabove.

The formulation method comprises a step 310 of receiving at least one magnitude representative of a first target color in a colorimetric space. The receiving step 310 is implemented via the man-machine interface 57 of the controller 44.

The receiving step 310 is, for example, identical to the receiving step 110 of the determination method described hereinabove.

The formulation method also comprises a step 320 of receiving at least one magnitude representative of a first initial color in the colorimetric space, the first initial color being the color of the hair to be colored of the individual, The receiving step 320 is implemented via the man-machine interface 57 of the controller 44.

The receiving step 320 is, for example, identical to the receiving step 120 of the determination method described hereinabove.

The formulation method comprises a step 330 of determining a cosmetic product composition according to the magnitudes representative of the first initial color and of the first target color, of the colorimetric rendering model, optionally associated with application rules, and of the colorimetric deviation parameter specific to the individual.

The determination step 330 is implemented by the controller 44 with interaction with the computer program product 48, i.e. is implemented by computer.

The determination step 330 is, for example, identical to the determination step 230 of the determination method such as described hereinabove.

The formulation method then comprises a step 340 of manufacturing a cosmetic product having the determined composition.

The manufacturing step 340 is implemented by the manufacturing unit 46. For example, the manufacturing unit 46 distributes and mixes (optionally based on application rules) at least two of the functional cosmetic mixtures stored in the containers in a proportion and/or a quantity making it possible to obtain the determined composition.

Thus, the formulation method makes it possible to formulate a composition specific to the coloring of the hairs of a given individual. The hairs of the individual are, then, colored with the formulated composition. The history of the individual is taken into account via the deviation parameter so that the rendering of the color is improved. Such a formulation method therefore makes it possible to improve the satisfaction of the consumer.

Although the description gives specific examples for the hair of an individual, those skilled in the art will understand that the present description applies to all types of hairs.

Those skilled in the art will understand that the embodiments described hereinabove can be combined to form new embodiments, provided that they are technically compatible.

The invention claimed is:

1. A method for determining at least one characteristic non-colorimetric parameter of hairs of a given individual, the method for determining the at least one characteristic non-colorimetric parameter comprising the steps of:
receiving a colorimetric deviation parameter specific to the given individual, and,
determining at least one characteristic non-colorimetric parameter of the hairs of the given individual from the colorimetric deviation parameter received;
the colorimetric deviation parameter being able to be obtained by a method for determining at least one parameter specific to the custom-made coloring of hairs of the given individual, according to a colorimetric rendering model, the method for determining the at least one parameter specific to the custom-made coloring of hairs comprising an initialization phase corresponding to a first coloring of the hairs of the individual, the initialization phase comprising the steps of:
receiving at least one magnitude representative of a first target color in a colorimetric space,
receiving at least one magnitude representative of a first initial color in the colorimetric space, the first color being the color of the hairs to be colored of the individual,
determining a cosmetic product composition according to the magnitudes representative of the first initial color and of the first target color and of the colorimetric rendering model,
applying a cosmetic product having the determined composition on the hairs to be colored of the individual in order to obtain colored hairs,
evaluating the color of the colored hairs in order to obtain at least one magnitude representative of a first final color in the colorimetric space, and
determining at least one colorimetric deviation parameter specific to the individual according to the magnitudes representative of the first final color and of the first target color;
wherein the determining of the at least one characteristic non-colorimetric parameter of the hairs is carried out to adapt the care provided to the hairs in order to color the hairs of the individual or the type of cosmetic products to be applied on the hairs in order to color the hairs; and the method for determining the at least one characteristic non-colorimetric parameter of hairs is implemented by a device;
wherein the receiving of the at least one magnitudes representative of the first target color and of the first initial color are implemented via a man-machine interface;
wherein the determining of the cosmetic product composition is implemented by a controller in interaction with a computer program product;
wherein the evaluating of the color of colored hairs is implemented by a colorimetric measuring unit; and
wherein the determining of the at least one colorimetric deviation parameter is implemented by the controller in interaction with the computer program product.

2. The method according to claim 1, wherein the method comprises a step of memorizing the colorimetric deviation parameter as historical data specific to the given individual.

3. The method according to claim 1, wherein the method comprises a customization phase corresponding to a second coloring of the hairs of the individual, the customization phase comprising the steps of:
receiving at least one magnitude representative of a second target color in the colorimetric space,
receiving at least one magnitude representative of a second initial color in the colorimetric space, the second color being the color of the hairs to be colored of the individual,
determining a cosmetic product composition according to the magnitudes representative of the second initial color and of the second target color, of the colorimetric rendering model and of the colorimetric deviation parameter determined during the initialization phase.

4. The method according to claim 3, wherein the customization phase comprises:
a step of applying a cosmetic product having the determined composition on the hairs to be colored of the individual in order to obtain colored hairs, and
a step of evaluating the color of the colored hairs in order to obtain at least one magnitude representative of a second final color in the colorimetric space.

5. The method according to claim 4, wherein the customization phase comprises an updating phase, where applicable, of the colorimetric deviation parameter specific to the individual according to the magnitudes representative of the second final color and of the second target color.

6. The method according to claim 3, wherein the customization phase is repeated for each new coloring of the hairs of the given individual according to at least the last colorimetric deviation parameter determined.

7. The method according to claim 6, wherein the time interval between two successive customization phases is at least one week, preferably at least three weeks.

8. A method for formulating a cosmetic composition specific to the custom-made coloring of hairs of a given individual according to a colorimetric rendering model, the method comprising the steps of:
receiving at least one colorimetric deviation parameter specific to the given individual, said parameter being able to be obtained by a determination method according to claim 1,
receiving at least one magnitude representative of a first target color in a colorimetric space,
receiving at least one magnitude representative of a first initial color in the colorimetric space, the first color being the color of the hairs to be colored of the individual,
determining a cosmetic product composition according to the magnitudes representative of the first initial color and of the first target color, of the colorimetric rendering model and of the colorimetric deviation parameter specific to the individual, and manufacturing a cosmetic product having the determined composition.

9. A method of custom-made coloring of hairs of a given individual, the coloring method comprising a step of applying a cosmetic composition on the hair of the individual, the cosmetic composition having been formulated according to the formulation method claim 8.

10. The method according to claim 1, wherein the or at least one non-colorimetric parameter is selected from the group consisting of: a permeability factor of the hairs of the individual, a rising factor of each colorant of the cosmetic product in the hairs of the individual, a resistance to oxidation of the hairs of the individual and a relationship between the eumelanin contained in the hairs of the individual with the pheomelanin contained in the hairs of the individual.

11. A device for determining at least one parameter specific to the custom-made coloring of hairs of a given individual, according to a colorimetric rendering model, the device being configured to implement at least one step of a determination method according to claim 1 comprising a controller comprising:
    a man-machine interface configured to implement each receiving step of the determination method, and
    a processing unit configured to implement at least the steps of determining a composition and of determining at least one deviation parameter.

12. A system for formulating a cosmetic composition specific to the custom-made coloring of hairs of a given individual, the system being configured to implement a formulation method according to claim 8, the system comprising a plurality of functional cosmetic mixtures stored in separate containers, the functional cosmetic mixtures being able to be combined with one another in order to form the cosmetic composition determined, the system being configured to distribute at least two functional cosmetic mixtures, each one in a determined proportion and/or a quantity.

13. The method according to claim 2, wherein the method comprises a customization phase corresponding to a second coloring of the hairs of the individual, the customization phase comprising the steps of:
    receiving at least one magnitude representative of a second target color in the colorimetric space,
    receiving at least one magnitude representative of a second initial color in the colorimetric space, the second color being the color of the hairs to be colored of the individual,
    determining a cosmetic product composition according to the magnitudes representative of the second initial color and of the second target color, of the colorimetric rendering model and of the colorimetric deviation parameter determined during the initialization phase.

14. The method according to claim 4, wherein the customization phase is repeated for each new coloring of the hairs of the given individual according to at least the last colorimetric deviation parameter determined.

15. The method according to claim 5, wherein the customization phase is repeated for each new coloring of the hairs of the given individual according to at least the last colorimetric deviation parameter determined.

16. A method for formulating a cosmetic composition specific to the custom-made coloring of hairs of a given individual according to a colorimetric rendering model, the method comprising the steps of:
    receiving at least one colorimetric deviation parameter specific to the given individual, said parameter being able to be obtained by a determination method according to claim 2,
    receiving at least one magnitude representative of a first target color in a colorimetric space,
    receiving at least one magnitude representative of a first initial color in the colorimetric space, the first color being the color of the hairs to be colored of the individual,
    determining a cosmetic product composition according to the magnitudes representative of the first initial color and of the first target color, of the colorimetric rendering model and of the colorimetric deviation parameter specific to the individual, and
    manufacturing a cosmetic product having the determined composition.

17. A method for formulating a cosmetic composition specific to the custom-made coloring of hairs of a given individual according to a colorimetric rendering model, the method comprising the steps of:
    receiving at least one colorimetric deviation parameter specific to the given individual, said parameter being able to be obtained by a determination method according to claim 3,
    receiving at least one magnitude representative of a first target color in a colorimetric space,
    receiving at least one magnitude representative of a first initial color in the colorimetric space, the first color being the color of the hairs to be colored of the individual,
    determining a cosmetic product composition according to the magnitudes representative of the first initial color and of the first target color, of the colorimetric rendering model and of the colorimetric deviation parameter specific to the individual, and
    manufacturing a cosmetic product having the determined composition.

18. A method for formulating a cosmetic composition specific to the custom-made coloring of hairs of a given individual according to a colorimetric rendering model, the method comprising the steps of:
    receiving at least one colorimetric deviation parameter specific to the given individual, said parameter being able to be obtained by a determination method according to claim 4,
    receiving at least one magnitude representative of a first target color in a colorimetric space,
    receiving at least one magnitude representative of a first initial color in the colorimetric space, the first color being the color of the hairs to be colored of the individual,
    determining a cosmetic product composition according to the magnitudes representative of the first initial color and of the first target color, of the colorimetric rendering model and of the colorimetric deviation parameter specific to the individual, and
    manufacturing a cosmetic product having the determined composition.

19. A method for formulating a cosmetic composition specific to the custom-made coloring of hairs of a given individual according to a colorimetric rendering model, the method comprising the steps of:
    receiving at least one colorimetric deviation parameter specific to the given individual, said parameter being able to be obtained by a determination method according to claim 5, receiving at least one magnitude representative of a first target color in a colorimetric space, receiving at least one magnitude representative of a first initial color in the colorimetric space, the first color being the color of the hairs to be colored of the individual, determining a cosmetic product composition according to the magnitudes representative of the first initial color and of the first target color, of the colorimetric rendering model and of the colorimetric deviation parameter specific to the individual, and manufacturing a cosmetic product having the determined composition.

\* \* \* \* \*